United States Patent
Hietala et al.

(10) Patent No.: US 9,606,423 B2
(45) Date of Patent: Mar. 28, 2017

(54) SYSTEM AND METHOD FOR IMPROVING CHROMA KEY COMPOSITING TECHNIQUE IN PHOTOGRAPHY

(71) Applicant: Tailorframe Oy, Helsinki (FI)

(72) Inventors: Jere Hietala, Hinthaara (FI); Jarno Saarinen, Helsinki (FI)

(73) Assignee: Tailorframe Oy, Helsinki (FI)

( * ) Notice: Subject to any disclaimer, the term of this patent is extended or adjusted under 35 U.S.C. 154(b) by 0 days.

(21) Appl. No.: 14/705,933

(22) Filed: May 6, 2015

(65) Prior Publication Data
US 2016/0327849 A1    Nov. 10, 2016

(51) Int. Cl.
| | |
|---|---|
| *G03B 15/02* | (2006.01) |
| *G03B 15/06* | (2006.01) |
| *F21K 5/06* | (2006.01) |
| *H04N 5/275* | (2006.01) |
| *H04N 9/75* | (2006.01) |

(52) U.S. Cl.
CPC ......... *G03B 15/06* (2013.01); *G03B 15/0442* (2013.01); *H04N 5/275* (2013.01); *H04N 9/75* (2013.01)

(58) Field of Classification Search
CPC  G03B 15/06; G03B 2215/0582; G03B 15/07; G03B 2206/00; G03B 2215/0571
USPC ...................................... 362/3–18
See application file for complete search history.

(56) References Cited

U.S. PATENT DOCUMENTS

| | | | |
|---|---|---|---|
| 4,629,298 A * | 12/1986 | Trumbull | G03B 15/10 353/28 |
| 5,117,283 A * | 5/1992 | Kroos | H04N 9/75 348/564 |
| 6,191,812 B1 | 2/2001 | Tzidon et al. | |
| 7,418,197 B2 * | 8/2008 | Didow | H04N 9/75 348/E9.056 |
| 7,894,713 B1 | 2/2011 | Clark | |
| 7,999,862 B2 | 8/2011 | Mack et al. | |
| 8,045,060 B2 | 10/2011 | Cole et al. | |
| 8,134,576 B2 | 3/2012 | Swanson et al. | |

(Continued)

FOREIGN PATENT DOCUMENTS

| | | |
|---|---|---|
| EP | 0838068 B1 | 10/2005 |
| WO | 01/20900 A2 | 3/2001 |

OTHER PUBLICATIONS

"DTC Presents: How to Easily and Professionally Light a Green Screen", Anonymous, Jul. 19, 2013, Retrieved from the Internet, URL: https://www.youtube.com/watch?v=llyE0ziuJ8, 1 page.

(Continued)

*Primary Examiner* — William Carter
(74) *Attorney, Agent, or Firm* — Ziegler IP Law Group, LLC

(57) ABSTRACT

Disclosed is a system for improving chroma key compositing technique in photography and/or videography. The system comprises at least a first flashlight arranged to be directed towards an object to be photographed, a chrome backdrop in front of which the object is to be photographed, and at least a first reflecting surface arranged partly in front of the first flashlight in such a manner that part of the light from the first flashlight is directed to the object to be photographed and part of the light from the first flashlight is reflected towards the chrome backdrop. The first reflecting surface has essentially the same colour as the chrome backdrop.

8 Claims, 1 Drawing Sheet

(56) References Cited

U.S. PATENT DOCUMENTS

2003/0001825 A1  1/2003  Omura et al.
2008/0166111 A1  7/2008  Didow et al.
2011/0149248 A1  6/2011  Ley et al.

OTHER PUBLICATIONS

"Time Trumpet—The Eastenders special effects artist", MANTLEPIES, Sep. 19, 2006, Retrieved from the Internet, URL: https://www.youtube.com/watch?v=UjhBf4vlTw0, 1 page.
International Search Report and Written Opinion of the International Searching Authority, application No. PCT/FI2016/050287, mailed Jul. 21, 2016, 12 pages.

* cited by examiner

SYSTEM AND METHOD FOR IMPROVING CHROMA KEY COMPOSITING TECHNIQUE IN PHOTOGRAPHY

TECHNICAL FIELD

The present disclosure relates generally to studio imaging; and more specifically, to a system and a method for improving chroma key compositing technique in photography and/or videography.

BACKGROUND

In the field of studio imaging, such as photography, different techniques for editing and creating final images (or photos) are used. One such example includes chroma key compositing technique, in which combination or layering of two or more images are done to create a final image. Typically, the chroma key compositing technique is applied to a foreground of an object's image (mostly a person) photographed using a camera in front of a chrome backdrop (such as a green screen, a blue screen etc). Generally, the chrome backdrop includes a single colour (such as blue or green because such colours are generally not associated with skin tones). In the chroma key compositing technique a background (which typically includes the colour of the chrome backdrop) of a captured image is separated from a foreground (object image) using an image editing algorithm, and thereafter the background is made transparent. Further, the transparent background is replaced with any desired background image to obtain the final image. One common application of chroma key compositing technique can be seen in television broadcasting, where a weather reporter in reality stands in front of the chrome backdrop and chroma key compositing technique is used to replace the chrome backdrop with a weather map.

Conventionally, a chroma key compositing system includes a plurality of flash lights (generally having white light) and a chrome backdrop (either having green or blue colour). Among the plurality of flash lights some flash lights are used for lighting the chrome backdrop and some flash lights are used for lighting an object to be photographed in front of the chrome backdrop. Typically, in order to obtain a high quality captured image, intensity of the flashlights directed towards the chrome backdrop is increased. However, increasing the intensity of the flashlights beyond a certain point tends to whiten the chrome backdrop, which in turn may reduce or fade the colour of the background in the captured image. Further, use of separate flashlights for lighting the chrome backdrop increases reflection of the light from the chrome backdrop towards the camera, which may also influence quality of the captured image. Moreover, if the colour of the foreground object is substantially same that of the colour of the chrome backdrop, the application of the chroma key compositing technique becomes very challenging, particularly, separating the background from the foreground based on the colour of the chrome backdrop. One way to address such issue is to use light emitting diodes (LEDs) instead the flash lights to light the chrome backdrop. However, such LED arrangements are very expensive and do not even offer required quality for the captured image.

Therefore, in light of the foregoing discussion, there exists a need to overcome the aforementioned drawbacks of a conventional chroma key compositing technique.

SUMMARY

The present disclosure seeks to provide a system for improving chroma key compositing technique in photography and/or videography.

The present disclosure also seeks to provide a method for improving chroma key compositing technique in photography and/or videography.

In one aspect, an embodiment of the present disclosure provides a system for improving chroma key compositing technique in photography and/or videography, the system comprising:
  a chrome backdrop in front of which an object is to be photographed;—at least a first flashlight arranged to be placed between the chrome backdrop and the object to be photographed, directed towards the object to be photographed; and
  at least a first reflecting surface arranged partly in front of the first flashlight in such a manner that part of the light from the first flashlight is directed to the object to be photographed and part of the light from the first flashlight is reflected towards the chrome backdrop,
wherein the first reflecting surface has essentially the same colour as the chrome backdrop.

In another aspect, an embodiment of the present disclosure provides a method for improving chroma key compositing technique in photography and/or videography, the method comprising directing light from at least a first flashlight
  partially towards an object to be photographed in front of a chrome backdrop; and
  partially towards a first reflecting surface arranged to reflect the light towards the chrome backdrop,
wherein the first reflecting surface has essentially the same colour as the chrome backdrop.

Embodiments of the present disclosure substantially eliminate or at least partially address the aforementioned problems in the prior art, and provides a system and a method for improving chroma key compositing technique in photography and/or videography.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
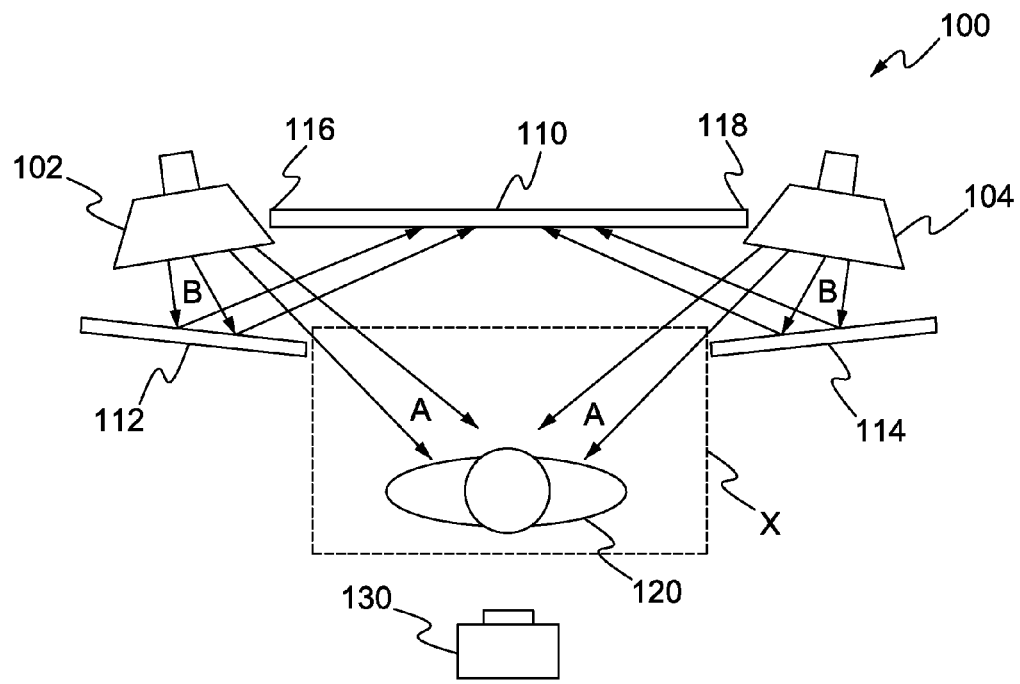
FIG. 1 is a schematic illustration of a system for improving chroma key compositing technique in photography and/or videography, in accordance with an embodiment of the present disclosure.

In the accompanying drawings, if any underlined number is employed that underlined number represents an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for improving chroma key compositing technique in photography and/or videography. The system comprises at least a first flashlight arranged to be directed towards an object to be photographed; a chrome backdrop in front of which the object is to be photographed; and at least a first reflecting surface arranged partly in front of the first flashlight in such a manner that part of the light from the first flashlight is directed to the object to be photographed and part of the light from the first flashlight is reflected towards the chrome backdrop. The first reflecting surface has essentially the same colour as the chrome backdrop.

In another aspect, an embodiment of the present disclosure provides a method for improving chroma key compositing technique in photography and/or videography. The method comprising directing light from at least a first flashlight partially towards an object to be photographed in front of a chrome backdrop; and partially towards a first reflecting surface arranged to reflect the light towards the chrome backdrop, wherein the first reflecting surface has essentially the same colour as the chrome backdrop.

In an embodiment, the system includes at least one flashlight. As mentioned above, the system includes at least the first flashlight arranged to be directed towards the object to be photographed. In one embodiment, the system also includes a second flashlight arranged to be directed towards the object to be photographed. Further, those skilled in the art would recognize that the system may include more than two flashlights.

In an embodiment, the first flashlight is arranged on a first side of the screen and the second flashlight is arranged on a second side, of the screen, opposite the first side. Specifically, the first and second flashlights are positioned on the first and second sides, respectively, and marginally in front of the chrome backdrop such that the light from the first and second flashlights is not obstructed by the chrome backdrop. Alternatively, the first and second flashlights may be positioned in line with the chrome backdrop or marginally at back of the chrome backdrop, but essentially such that the light from the first and second flashlights is not obstructed by the chrome backdrop.

In an embodiment, the first and second flashlights are white light emitting flashlights. For example, the first and second flashlights are portable white light sources having at least one lighting element, such as a flash tube. Alternatively, the first and second flashlights may include other lighting element, such as light emitting diodes. Further, the first and second flashlights may be battery operated or adapted to be powered using electrical cords. Moreover, the first and second flashlights may include control elements for regulating light output or intensity thereof.

The system also includes the chrome backdrop in front of which the object is to be photographed. According to an embodiment, the chrome backdrop is essentially opaque in nature and/or capable of reflecting light therefrom. In an embodiment, the chrome backdrop comprises a flat structure made of a material having sufficient structural integrity such that the chrome backdrop can be arranged or held at the back of the object to be photographed. Specifically, the chrome backdrop includes at least one uniform surface that faces the back of the object and reflects light from the first and second flashlights. Further, the chrome backdrop may be made of paper, fabric, plastic, metal, glass, ceramic, wood or any combination thereof. For example, the chrome backdrop may be made of a thick piece of paper or cloth. Also, the chrome backdrop may be configured to have a shape, such as a rectangular shape, essentially large enough to cover the object from the back. Alternatively, the chrome backdrop may be configured to other shape such as oval, circular or any polygonal shape.

In an embodiment, the chrome backdrop comprises a single colour. According to an embodiment, the colour comprises a green colour or a blue colour. Those skilled in the art would recognize that such colours may be used because they are generally not associated with the colour of the objects, for example natural skin tones of a human. Otherwise, the colour can include any other colour, apart from green or blue, such as red, yellow and the like. Alternatively, the chrome backdrop may include a relatively narrow range of colours. Also, the chrome backdrop may be painted, wrapped with a coloured article or made of a coloured material itself. For example, if the chrome backdrop is made of metal or glass, the chrome backdrop may be painted (using any suitable acrylic latex paint and oil-based paint) or wrapped with a coloured article (such as coloured paper or cloth). Additionally, the chrome backdrop may be made of the coloured material itself, such as coloured paper, coloured cloth, coloured plastic material and the like.

In an embodiment, the system includes at least one reflecting surface. As mentioned above, the system includes at least a first reflecting surface arranged partly in front of the first flashlight in such a manner that part of the light from the first flashlight is directed to the object to be photographed and part of the light from the first flashlight is reflected towards the chrome backdrop. According to one embodiment, the system further comprises a second reflecting surface arranged partly in front of the second flashlight in such a manner that part of the light from the second flashlight is directed to the object to be photographed and part of the light from the second flashlight is reflected towards the chrome backdrop. Specifically, the system typically includes a number of reflecting surfaces corresponding to the number of flashlights.

According to an embodiment, the first and second reflecting surfaces are essentially opaque in nature and capable of reflecting light therefrom. In one embodiment, the first and second reflecting surfaces comprise a flat structure made of a material having sufficient structural integrity such that the first and second reflecting surfaces can be arranged in front of the flashlights for reflecting the light towards the chrome backdrop. Specifically, each of the first and second reflecting surfaces includes at least one uniform surface that faces the light from the first and second flashlights. Further, the first and second reflecting surfaces may be made of paper, fabric, plastic, metal, glass, ceramic, wood or any combination thereof (essentially capable of reflecting the light). For example, the first and second reflecting surfaces can be a thick piece of paper or cloth. Moreover, the first and second reflecting surfaces may be configured to have a shape, such as a rectangular shape (essentially large enough to substantially reflect the light from the first and second flashlights towards the chrome backdrop). Alternatively, the first and second reflecting surfaces may be configured to have other shape, such as oval, circular or any polygonal shape.

In an embodiment, the first and second reflecting surfaces also comprise a single colour. Specifically, the first and second reflecting surfaces may be painted, wrapped with a coloured article or made of a coloured material itself. For example, if the first and second reflecting surfaces are made of metal or glass, the first and second reflecting surfaces may be painted (using any suitable acrylic latex paint and oil-based paint) or wrapped with a coloured article (such as coloured paper or cloth). Alternatively, the first and second reflecting surfaces may be made of the coloured material itself, such as coloured paper, coloured cloth, coloured plastic material and the like.

As mentioned above, the first reflecting surface has essentially the same colour as the chrome backdrop. Specifically, both the first and second reflecting surfaces have essentially the same colour as the chrome backdrop. For example, the first and second reflecting surfaces can have either the green colour or the blue colour corresponding to the colour of the chrome backdrop. Alternatively, the first and second reflecting surfaces can have any other colour (such as red or yellow) corresponding to the colour of the chrome backdrop.

In operation, initially the first and second flashlights are switched on, and an object to be photographed is positioned in front of the chrome backdrop. Therefore, a part of the light (from the first and second flashlights) focuses on the object, whereas another part of the light (from the first and second flashlights) focuses on the reflecting surface. The part of the light focused on the object illuminates the object, and the part of the light focused on the chrome backdrop deepens the colour the chrome backdrop. Specifically, the part of the light focused towards the chrome backdrop initially hits the first and second reflecting surfaces, and thereafter is reflected towards the chrome backdrop. In such instance, the first and second reflecting surfaces (having same colour that of the chrome backdrop) enables in reflecting same coloured light therefrom towards the chrome backdrop, which makes the colour of the chrome backdrop deeper and brighter. Further, as the part of the light focused towards the object to be photographed, this eliminates the reflection from the chrome backdrop.

Moreover, the system (particularity, based on the light from the first and second flashlights) provides an effective area in front of the chrome backdrop, where the object can be photographed in a manner such that a captured image of the object enables efficient application of the chroma key compositing technique on the captured image.

The chroma key compositing technique includes editing of the captured image (of an object taken by a camera) to obtain a final image. The term "captured image" used herein means any image that is taken by the camera and needs editing, whereas the term "final image" used herein means the edited captured image. Further, the captured image should essentially include a background (i.e. colour of the chrome backdrop) and a foreground (i.e. object's image). The chroma key compositing technique includes separating the background from the foreground using a suitable image editing algorithm. Further, the separated background (i.e. colour of the chrome backdrop) is made transparent. Thereafter, a desirable background (which can be a scenery, a famous monument or architecture, and like) is inserted in place of the transparent background to obtain the final image.

The system of the present disclosure further enables application of the chroma key compositing technique on a captured image having a foreground (i.e. the colour of the chrome backdrop) and a background of substantially same colour. For example, when the chrome backdrop of the system includes a green colour, and an object to be photographed in front of the chrome backdrop includes the same green colour (such as a person wearing green clothing). In such instance, the aspects of the present disclosure, particularly, the deep and bright coloured chrome backdrop and reduced reflection from the chrome backdrop enable differentiation of the foreground from the background in terms of colours thereof. Specifically, the background looks deeper and brighter (due to the same coloured reflected light provided by the first and second reflecting surfaces) compared to the foreground in the captured image. This improves the chroma key compositing technique, i.e. suitably separating the background and the foreground based on their colour differences for efficiently applying chroma key compositing technique on captured images.

It may be evident to those skilled in art that if the colour of the foreground becomes exactly same as the colour of the background, when the object is placed in front of the chrome backdrop and the flashlight are turn on. In such instance, the system of the present disclosure may not enable efficient application of the chroma key compositing technique on captured images.

According to an embodiment, the system of the present disclosure primarily relates to photography, i.e. the system is used for efficient application of the chroma key compositing technique on still captured images of an object. Alternatively, the system of the present disclosure may also relate to videography. In the present description, by photography, both photography and videography are meant. Specifically, the system of the present disclosure may be used for videography (i.e. using the system of the present disclosure improving chroma key compositing technique for moving images or videography), when constant lights are used instead of flashlights.

In one embodiment, the system of the present disclosure may be arranged in a studio, and used in conjunction with either photography or videography. Alternatively, the system of the present disclosure may be arranged in any closed environment, such as a living room capable of accommodating the system elements (such as the flashlights, the chrome backdrop and the reflecting surface) and used for photography and/or videography.

The present disclosure provides a system and a method for improving chroma key compositing technique in photography and/or videography. Specifically, the present disclosure enables in improving various aspects associated with chroma key compositing technique. For example, the system provides a deep and bright coloured chrome backdrop in front of which an object can be photographed. Further, the system reduces reflection from the chrome backdrop, which helps in improving a quality of captured images. Moreover, the present disclosure enables application of the chroma key compositing technique on the captured images having substantially same coloured foreground and background. The system and method of the present disclosure utilizes fewer elements (such as two flashlights compared to four flashlights of a conventional arrangement) and are easy to set up. Further, the system and method of the present disclosure provides economic approach for improving chroma key compositing technique in photography and/or videography.

DETAILED DESCRIPTION OF THE DRAWINGS

Referring to FIG. 1, illustrated is a schematic illustration of a system 100 for improving chroma key compositing technique in photography and/or videography, in accordance with an embodiment of the present disclosure. The system 100 includes at least one flashlight, such as a first flashlight 102 and a second flashlight 104, a chrome backdrop 110, and at least one reflecting surface, such as a first reflecting surface 112 and a second reflecting surface 114. The first flashlight 104 is arranged on a first side 116 of the chrome backdrop 110 and the second flashlight 104 is arranged on a second side 118, of the chrome backdrop 110, opposite to the first side 116. Further, the chrome backdrop 110 is arranged behind an object 120, in such way that the chrome backdrop 110 in front of which the object can be photographed using a camera 130.

As shown, the first and second flashlights 102, 104 are arranged to be directed towards the object 120 to be photographed. Further, the first and second reflecting surfaces 112, 114 are arranged partly in front of the first and second flashlights 102, 104, respectively. Therefore, part of the light (shown with arrows A) from the first and second flashlights 102, 104 is directed to the object 120 to be photographed, and part of the light (shown with arrows B) from the first and second flashlights 102, 104 is reflected towards the chrome backdrop 110. Specifically, the part of the light (shown with arrows B) from the first and second flashlights 102, 104 is reflected towards the chrome backdrop 110 by the first and second reflecting surfaces 112, 114, respectively. The first and second reflecting surfaces 112, 114 have essentially the same colour as the chrome backdrop 110.

In operation, the part of the light (shown with arrows A) is focused on the object 120 to illuminate the object 120, whereas the part of the light (shown with arrows B) is focused on the chrome backdrop 110 to deepen the colour the chrome backdrop 110. Specifically, the part of the light (shown with arrows B) reflects from the reflecting surfaces 112, 114 (having same colour as the chrome backdrop 110) to provide same coloured reflected light to the chrome backdrop 110. Further, the reflecting surfaces 112, 114 help in reducing reflection from the chrome backdrop 110. The system 100 (particularity, the parts of the light shown with arrows A and B) creates an effective area X (shown with dash lines) in front of the chrome backdrop 110, where the object 120 can be photographed in a manner such that a captured image of the object 120 enables efficient application of the chroma key compositing technique thereon. Also, when the object 120 and the chrome backdrop 110 includes substantially same colour.

Figure 2:
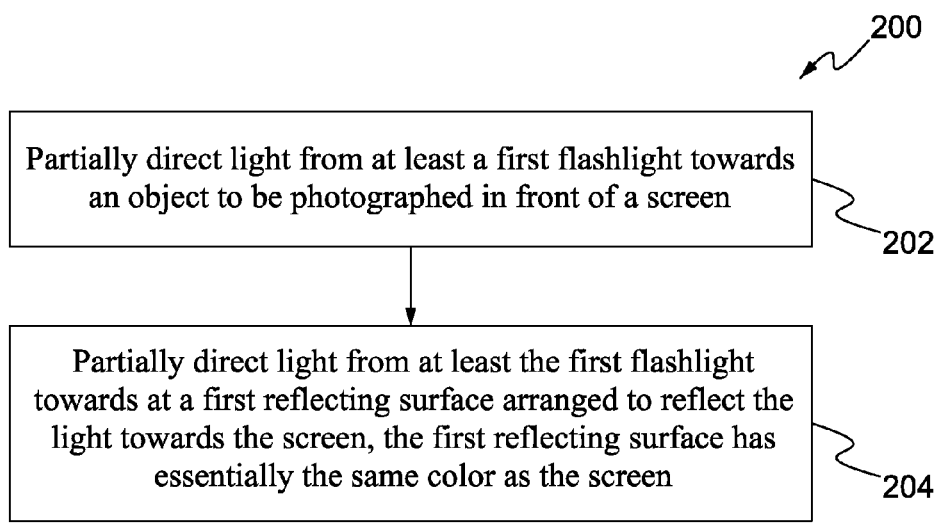
FIG. 2 is an illustration of steps of a method for improving chroma key compositing technique in photography and/or videography, in accordance with an embodiment of the present disclosure.

Referring now to FIG. 2, illustrated are steps of a method 200 for improving chroma key compositing technique in photography and/or videography, in accordance with an embodiment of the present disclosure. Specifically, those skilled in the art would recognize that the method 200 illustrates steps involved in the operation of the system 100, explained in conjunction with the FIG. 1.

At step 202, light is partially directed from at least a first flashlight towards an object to be photographed in front of a chrome backdrop.

At step 204, light is partially directed from at least the first flashlight towards a first reflecting surface arranged to reflect the light towards the chrome backdrop. The first reflecting surface has essentially the same colour as the chrome backdrop.

The steps 202 to 204 are only illustrative and other alternatives can also be provided where one or more steps are added, one or more steps are removed, or one or more steps are provided in a different sequence without departing from the scope of the claims herein. For example, the method 200 further includes directing light from a second flashlight partially towards the object to be photographed in front of the chrome backdrop, and partially towards a second reflecting surface arranged to reflect the light towards the chrome backdrop.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for improving chroma key compositing technique in photography and/or videography, the system comprising:
   a chrome backdrop in front of which an object is to be photographed;
   at least a first flashlight arranged to be placed between the chrome backdrop and the object to be photographed, directed towards the object to be photographed; and
   at least a first reflecting surface arranged between the chrome backdrop and the object to be photographed, and partly in front of the first flashlight in such a manner that part of the light from the first flashlight is directed to the object to be photographed and part of the light from the first flashlight is reflected towards the chrome backdrop,
   wherein the first reflecting surface has a color that is essentially the same as the chrome backdrop.

2. A system according to claim 1, comprising a second flashlight and a second reflecting surface arranged partly in front of the second flashlight in such a manner that part of the light from the second flashlight is directed to the object to be photographed and part of the light from the second flashlight is reflected towards the chrome backdrop.

3. A system according to claim 2, wherein the first flashlight is arranged on a first side of the chrome backdrop and the second flashlight is arranged on a second side of the chrome backdrop, opposite to the first side.

4. A system according to claim 1, wherein the flashlight is a white light emitting flashlight.

5. A system according to claim 1, wherein the color comprises one of a green color and a blue color.

6. A method for improving chroma key compositing technique in photography and/or videography, the method comprising directing light from at least a first flashlight
   partially towards an object to be photographed in front of a chrome backdrop, and
   partially towards a first reflecting surface arranged between the chrome backdrop and the object to be photographed, and arranged to reflect the light towards the chrome backdrop, wherein the first reflecting surface has a color that is essentially the same as the chrome backdrop.

7. A method according to claim 6, further comprising directing light from a second flashlight
- partially towards the object to be photographed in front of the chrome backdrop, and
- partially towards a second reflecting surface arranged to reflect the light towards the chrome backdrop.

8. A method according to claim 6, wherein the color comprises one of a green color and a blue color.

* * * * *